United States Patent
Venkatesan et al.

(10) Patent No.: US 6,209,093 B1
(45) Date of Patent: *Mar. 27, 2001

(54) TECHNIQUE FOR PRODUCING A PRIVATELY AUTHENTICATABLE PRODUCT COPY INDICIA AND FOR AUTHENTICATING SUCH AN INDICIA

(75) Inventors: Ramarathnam R. Venkatesan, Bellevue, WA (US); Peter L. Montgomery, San Rafael, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/102,948

(22) Filed: Jun. 23, 1998

(51) Int. Cl.[7] .................................................. H04L 9/00
(52) U.S. Cl. .................................................... 713/176
(58) Field of Search .................................. 713/168, 170, 713/176, 180, 187

(56) References Cited

U.S. PATENT DOCUMENTS

| | | | |
|---|---|---|---|
| 5,299,262 | * 3/1994 | Brickell et al. | 380/28 |
| 5,581,616 | 12/1996 | Crandall | 380/28 |
| 5,638,447 | * 6/1997 | Micali | 713/180 |

OTHER PUBLICATIONS

Desmedt Yvo G. "Threshold Cryptography." ETT. Jul. 1994. pp. 35–43.*
Menezes, Alfred, Paul van Oorshcot, and Scott Vanstone. "Handbook of applied cryptography." CRC Press. 1997. pp. 297 and 348.*
Miller, Ray A. "The cryptographic mathematics of Enigma." Center for Cryptologic History, National Security Agency. Date unknown. all pages.*
Botes, J. J. and W. T. Pezhorn. "Public–key cryptosystems based on elliptic curves." IEEE. 1993. all pages.*

* cited by examiner

Primary Examiner—Gail Hayes
Assistant Examiner—Anthony DiLorenzo
(74) Attorney, Agent, or Firm—Michaelson & Wallace; Peter L. Michaelson (57) ABSTRACT

A technique for generating, for a given message to be signed, an authentic cryptographic signature that can be authenticated, by a recipient of the signed message, as having originated from a signor of the message; and appropriately authenticating such a signature. Specifically, this technique, given a message, such as, e.g., a numerical product copy identifier (83, 93), forms an authentic signature (87, 97), based on public-key cryptosystem, through use of generator value selected from points on an elliptic curve over a finite field. The authentic signature is generated using the generator value in conjunction with three keys; namely, a public key, a private key and a secret key, and thus substantially increases the security associated with cryptographic signatures generated through a conventional two-key public key cryptosystem. A unique product copy indicia can be formed by concatenating the identifier, for a given product copy, with its corresponding authentic signature. During subsequent user installation of that copy to a computer, the user enters the indicia when prompted by execution of an installation program which, in turn, privately authenticates the signature contained in the indicia in order to continue or prematurely terminate the installation.

54 Claims, 4 Drawing Sheets

FIG. 3

FIG. 4
INDICIA GENERATION PROCESS
400

FIG.5

TECHNIQUE FOR PRODUCING A PRIVATELY AUTHENTICATABLE PRODUCT COPY INDICIA AND FOR AUTHENTICATING SUCH AN INDICIA

BACKGROUND OF THE DISCLOSURE

1. Field of the Invention

The invention relates to cryptography, particularly a technique for: generating, for a given message to be signed, an authentic cryptographic signature that can be privately authenticated, by a recipient of the signed message, as having originated from a signor of the message; and appropriately authenticating such a signature.

2. Description of the Prior Art

Over the centuries, for as long as information has been communicated between two individuals, information has been susceptible to third-party interception, eavesdropping, compromise and/or corruption. Clearly, the problem of securely protecting information from such acts has existed for quite a long time.

Traditionally, this problem has been handled through the development, over the years, of increasingly sophisticated cryptographic techniques. One class of these techniques involves the use of key-based ciphers. In particular, through a key-based cipher, sequences of intelligible data, i.e., plaintext, that collectively form a message are each mathematically transformed, through an enciphering algorithm, into seemingly unintelligible data, i.e., so-called ciphertext. Not only must the transformation be completely reversible, i.e., two way in the sense that the ciphertext must be invertible back to its corresponding original plaintext but also on a 1:1 basis, i.e., each element of plaintext can only be transformed into one and only one element of ciphertext. In addition, a particular cipher that generated any given ciphertext must be sufficiently secure from cryptanalysis. To provide a requisite level of security, a unique key is selected which defines only one unique corresponding cipher, i.e., precluding, to the extent possible, a situation where multiple differing keys each yields reversible transformations between the same plaintext-ciphertext correspondence. The strength of any cryptographic technique and hence the degree of protection it affords from third-party intrusion is directly proportional to the time required, by a third-party, to perform cryptanalysis, e.g., with a key-based cipher to successfully convert the ciphertext into its corresponding plaintext without prior knowledge of the key. While no encryption technique is completely impervious from cryptanalysis, an immense number of calculations and an extremely long time interval required therefor—given the computing technology then available—required to break a cipher without prior knowledge of its key effectively renders many techniques, for all practical intents and purposes, sufficiently secure to warrant their widespread adoption and use. In that regard, as recently as a few years ago, if a cipher was of such complexity that it required on the order of man-years or more to break, in view of the state of the processing technology then available to do so, the underlying cryptographic technique was viewed by many as rendering a sufficient decree of security to warrant its use.

Public-key algorithms are one form of a key-based cipher. In such an algorithm, each communicating party generates a public-private key pair. Each party posts his(her) public key to a publicly accessible bulletin board, server or other facility, but maintains the corresponding private key in secret. In essence, an originating party desiring to encrypt a plaintext message and transmit it to another party, i.e., a destination party, both using the same public-key algorithm, will first access the public key of the destination party, encrypt the plaintext message using that public key into a ciphertext message and transmit the ciphertext message to the destination party. After receipt of the ciphertext message, the destination party, using his(her) private key, will then decrypt the message to recover the original plaintext. The keys are precisely computed, through use of very specific algorithms, to provide a requisite level of security while guaranteeing complete reversibility.

While public-key cryptographic systems can provide extremely secure encryption, to the point where breaking a public-key cipher is simply infeasible given the sheer number of operations potentially required to do so, such systems do have drawbacks that can limit their use. A principal drawback with a public-key system is its dependence on individual keys and a modulus that each carries a rather long bit sequence. For example, a modulus can easily be 1024 bits in length, while an individual key can be formed of a sequence of hundreds of bits. In some applications, such as cryptographic application programs where such keys can be readily stored, indexed and accessed as needed, the key length presents few, if any, practical problems for a user. For other applications, such long key sequences, even if converted to alphanumeric data, can still yield exceedingly long character strings that preclude easy manual entry by a user. In fact, the source of the extreme security of a public-key system lies in its use of very long bit sequences both for the keys and the modulus. If the modulus were to be appreciably shortened, then an encrypted message could be easily broken by cryptanalysis and hence the security of the underlying system readily compromised.

Computing technology continues to rapidly evolve. Processors, once unheard of just a few years ago in terms of their high levels of sophistication and speed, are becoming commercially available at ever decreasing prices. Consequently, processing systems, such as personal computers and workstations, that were previously viewed as not possessing sufficient processing power to break many so-called "secure" cryptographic ciphers are now, given their current power and sophistication, providing third parties with the necessary capability to effectively break those same ciphers. What may have taken years of continual computing a decade ago can now be accomplished in a very small fraction of that time. Hence, as technology evolves, the art of cryptography advances in lockstep in a continual effort to develop increasingly sophisticated cryptographic techniques that withstand correspondingly intensifying cryptanalysis.

Totally apart from cryptography, during at least the past decade, computer software manufacturers have been and continue to be subject to considerable unauthorized use of their products by unlicensed third parties. This is due, in part, to the relative ease with which a distribution media, such as diskettes or a CD-ROM, containing a software program can be duplicated. In an effort to thwart such unauthorized use, a relatively long alphanumeric indicia is often distributed with each legitimate copy of a packaged software product and must be entered by a user, when prompted during user installation of that copy on a computer. In particular, the copy includes an installation program which is first loaded and executed by the user to initiate and properly sequence through the entire installation process. Typically, at an early point in the installation process, the program will prompt the user of the copy being installed to manually enter the indicia. The indicia may contain, e.g., ten or more digits. In the case of distribution via compact discs (CDs), the indicia is printed on a label affixed to each case containing a CD. With diskette based distribution, the indicia is often printed on a certificate or other insert included within each software package. In any event, once the user has fully entered the indicia and has so signaled the program, typically by clicking an "OK" button (or the like) displayed on a monitor, the installation program will attempt to validate that indicia in an effort to determine whether the specific copy being installed is a licensed version or not. If the indicia is validated, the installation process proceeds; otherwise, it prematurely terminates. The underlying premise is that each user (i.e., licensee), who has legally obtained a valid copy, will possess the entire packaging as provided by the manufacturer and hence will have a valid indicia; but, an unauthorized user who simply obtains a copy of the program itself without any of the attendant packaging and/or inserts will not have the indicia. Given the length of the indicia, the probability is rather small that a user will simply pick a valid indicia at random. Hence, a user who attempts to install an unauthorized copy would be expected to repeatedly enter incorrect indicia, thus, for all practical purposes, never succeeding at installing the copy of program (s)he obtained and consequently rendering that copy effectively useless.

Unfortunately, in practice, the underlying algorithms for generating such indicia have proven to be relatively easy to discern and apparently have been rather widely and illicitly disseminated. Therefore, given the apparent availability of the algorithms, an unauthorized user, given some effort, can obtain a valid indicia for a program (s)he seeks to install. Hence, the manufacturer is often frustrated in its efforts to thwart use of such unauthorized copies.

Clearly, software manufacturers lose revenue from unauthorized copies of their products. Moreover, software manufacturers frequently provide customer support, of one form or another, for their products. In an effort to limit such support to their licensees, customer support staffs often require a user to first provide the indicia associated with his(her) copy of the product for which (s)he seeks support as a condition to receiving support. Given the ease with which unauthorized users can obtain valid indicia, software manufacturers are experiencing considerable difficulty in discriminating between licensees and such unauthorized users in order to provide support to the former while denying it to the latter. As a result, manufacturers often unwittingly provide support to unauthorized users, thus incurring additional and unnecessary support costs. If the number of unauthorized users of a given software product is sufficiently large, then these excess costs associated with that product can be quite significant.

Therefore, a need exists in the art for a technique that permits a software manufacturer to appreciably reduce the incidence of unauthorized copying of its software product. Such a technique should uniquely identify each copy of that product and permit the authenticity of that particular copy to be determined. Preferably, such a technique should involve cryptographically generating a sufficiently secure identifier through a public-key system (i.e., given the current state and expected evolution of computer technology, a third party, in the absence of knowing the keys, would face an infeasible task of generating a valid identifier). Furthermore, the identifier should be sufficiently long to ensure its security but not excessively long as to frustrate a user who has to manually provide the identifier when necessary, such as during an installation process or during the course of obtaining product support. Through use of such a technique, a software manufacturer should be able to appreciably reduce unauthorized use of its software product and the associated costs it otherwise incurs. Doing so might, in turn, economically permit that manufacturer to offer other services, such as promotions, to its licensees, thereby increasing licensee satisfaction with both the product and the manufacturer.

SUMMARY OF THE INVENTION

Advantageously, our present invention satisfies this need and overcomes the deficiencies in the art by forming, given a message, such as, e.g., a numerical product copy identifier, an authentic cryptographic signature, based on a public-key cryptosystem and through use of a generator value selected from points on an elliptic curve over a finite field. Our technique forms an authentic signature using the generator value in conjunction with three keys; namely, a public key, a private key and a secret key, and thus substantially increases the security associated with cryptographic signatures generated through a conventional two-key public-key cryptosystem.

Through use of our invention, knowledge of the public and private keys alone is grossly insufficient to permit one, in the realm of current feasibility and without knowledge of the secret key, to generate a new signed message pair containing an authentic signature.

In accordance with our inventive teachings, given points on a specific elliptic curve, the value of a certain point on the curve is selected as a generator value. The private key is randomly selected. The public key is determined as a predefined function of the values of the generator and the private key, particularly exponentiation of the former by the latter. The secret key is used to generate a pseudo-random number. A first portion of the authentic signature is then generated through predefined functions of the generator, the pseudo-random number and a message (such as a randomly selected identifier). Specifically, the generator is first exponentiated by the value of the pseudo-random number to yield a value which, in turn, is then concatenated with the message. A resulting concatenated number is then processed through a predetermined hash function to yield the first portion of the authentic signature. A remaining portion of the authentic signature is produced in response to a predefined function of the first portion, the pseudo-random value and the private key. The entire authentic signature is finally produced by concatenating both portions of the signature together.

A binary indicia, such as for use with a software product copy, is formed by concatenating the identifier with the authentic signature. The binary indicia is converted to alphanumeric form and then associated with the product copy, typically by being printed on a label to be affixed to packaging for that copy. The public key and the generator value are stored within an appropriate file(s) in the product copy itself for use during subsequent authentication of the copy during its installation on a client computer.

During installation of the product copy, the signature entered by a user is authenticated by first computing, at the client computer, the first portion of the signature using the generator value, the public key and the entire indicia, specifically its identifier and the signature, entered by the user. Thereafter, the value of this first portion is compared against the value of same portion in the signature contained in the indicia, which the user entered, to determine whether these two values identically match. If such a match exists, the entered signature is authentic and installation of this copy proceeds; otherwise, it is not authentic and installation is prematurely terminated.

Three distinct phases are used to implement our invention in conjunction with generating product copy indicia: (a) initialization, that occurs once, typically by the software manufacturer, to generate various parameter values; (b) indicia generation, which repeatedly occurs at a media duplication site, using the parameter values produced during initialization, to generate, for each different product copy a corresponding indicia containing an authentic signature for use with that copy; and (c) authentication, that separately and subsequently occurs, at a user site, during execution of an installation program, to authenticate the signature, in an indicia entered by a user and associated with a particular product copy which the user is then attempting to install.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of our present invention can be utilized in any one of a wide range of applications where a need arises, at a sender, to generate a cryptographic signature for a given message. Our invention is particularly, though not exclusively, suited for use in those instances where signatures are to be generated for a unique series of messages all emanating from a common sender, i.e., a signor. Not only does each resulting signature provide high security, i.e., is infeasible to cryptanalyze, but also it can be authenticated as emanating from only that common signor. In this regard, each such signature can be publicly verified, through use of a public key, as being a member of a set of valid signatures, and moreover can also be privately and uniquely authenticated using a secret key. Advantageously, through use of our invention, even if a third party (not the intended signor) were to determine, through cryptanalysis, how to illicitly generate a signature that would appear to be valid to its recipient, that third party would still face an infeasible task of properly authenticating that particular signature to its recipient. To simplify the following discussion, we will discuss our invention in the context of generating a signature that is to be used within a corresponding indicia which itself is uniquely associated with a given copy of a software product, for purposes of authenticating that particular copy during its installation on, e.g., a client personal computer (PC).

A. Environment of Use

Figure 1:
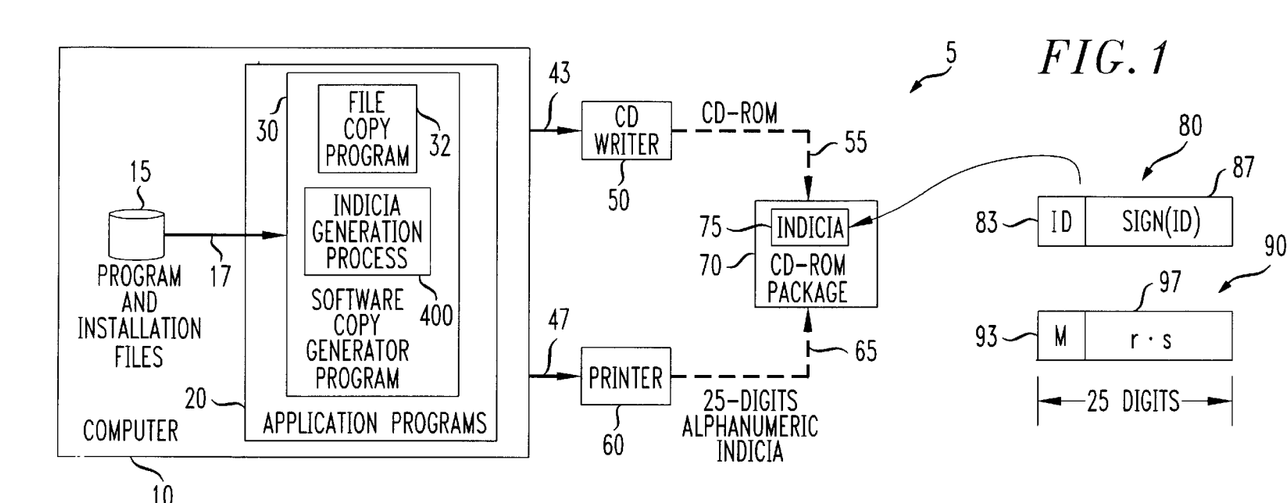
FIG. 1 depicts a high-level, though simplified, block diagram of CD-ROM production system 5 that incorporates the teachings of the present invention.

Consider FIG. 1 which depicts a high-level, though simplified, block diagram of CD-ROM production system 5. This system, in its rudimentary form shown, contains computer 10, CD writer 50 and printer 60. This system produces a CD-ROM that contains all the files needed to collectively implement a complete copy of an application program, such as for inclusion in a packaged software product. This product can be, e.g., a word processing program, a spreadsheet program, a suite of such programs collectively offered together, an operating system, or any other packaged software product that is produced and distributed as a unitary entity by its manufacturer.

Not only does system 5 copy all the files needed to implement a given copy, but also this system generates an alphanumeric indicia that is generally printed on a label and affixed to either a carrier containing the CD-ROM or a box into which the CD-ROM is placed. This indicia performs two functions: (a) it uniquely identifies the particular CD-ROM with which it is associated, and (b) through the present invention, it can be cryptographically authenticated for that particular CD-ROM and essentially no other. As to the latter function, subsequently, whenever the indicia is entered by a user when prompted to do so, while installing the product from that particular CD-ROM onto a PC (this process being generally described below in conjunction with FIG. 2 and in detail with FIG. 5), an authentication procedure, executing as part of the installation program will, in conjunction with specific information (including public and secret keys) stored on the CD-ROM, cryptographically determine whether the indicia, which the user has just entered, emanated from the manufacturer and is authentic for this particular CD-ROM.

Though the manufacturer may generate a large set of valid indicia for its own use or distribute that set, in a secure manner, to authorized third party disk duplicators during manufacture of the product, each and every indicia generated by system 5 for a given copy of the product can be uniquely authenticated for its corresponding product copy. In this manner, should a third party obtain an illicit copy of the software, including all the application and installation files—regardless of the media on which that copy were to reside, it will be infeasible for that party, even having a list of valid indicia, to generate an indicia that can be properly authenticated for that specific copy.

With specific reference to FIG. 1, computer 10, locally stores and executes application programs 20 and specifically software copy generator program 30. To the extent relevant, program 30 controls a process of producing, e.g., a CD-ROM that stores a copy of all files required to collectively implement a copy of a packaged software product. These files include all program (which includes associated data files, if any) and installation files required to fully install and implement the product on a remote computer, e.g., a client PC. Within computer 10, these files collectively reside on program store 15, illustratively a local hard disk, which could alternatively be implemented through a network connection to a remote file server. These files are downloaded, as symbolized by line 17, in sequential order through conventional file copy program 32 executing within software copy generator program 30. Program 32 specifies the particular files to be downloaded, accesses each of these files in order from program store 15 and downloads each such file to CD writer 50 with an instruction to write that file onto a CD-ROM then inserted into the writer. Indicia Generation Process 400, as discussed in detail below and particularly in conjunction with FIG. 4, generates alphanumeric indicia 75, typically 25 digits in length, that is to be associated with the particular CD-ROM to which these files are being written. Once the indicia has been generated by process 400, this process supplies this indicia to printer 60, shown in FIG. 1, which prints the indicia onto a label. After all the files have been copied onto the CD-ROM, it is then inserted, as symbolized by dashed line 55, into suitable packaging, such as a CD-ROM carrier. The label is then affixed, as symbolized by dashed line 65, onto an outer surface of this packaging. Process 400 can be executed such that the indicia is generated substantially coincident while the program files are being written to the CD-ROM or on a time staggered relationship therewith. Though system 5 is shown, for simplicity, as containing just a single computer, a single CD-writer and a single printer, in actuality, system 5 can contain multiple computers—usually with networked connections to a remote file server, multiple writers and multiple printers to implement pipelined and parallel program duplication operations, as desired.

Indicia 75, shown in representation 80, contains fields 83 and 87 which contain an identifier (ID) followed by a signature produced from that identifier, i.e., SIGN(ID). As shown in detail representation 90 of the indicia, the identifier contains a message, M, having a value which is unique to each and every copy of every product produced by a software manufacturer. Illustratively, this message, when converted to binary, is a 32-bit binary serial number unique to just one copy of one software product taken across all products produced by the manufacturer. The signature, when converted to binary, contains an illustrative 83-bit value that is a concatenation (a concatenation operation being represented "∘") of two values, r and s, which are discussed in detail below and, through our present invention, are formed by the manufacturer using the identifier.

Figure 2:
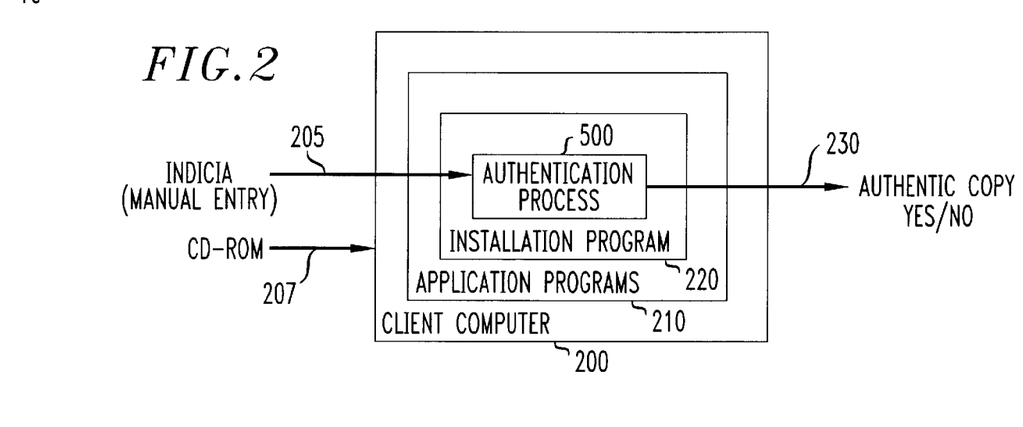
FIG. 2 depicts a high-level block diagram of a typical client computer 200 that illustratively utilizes the present invention during the course of installing a program from a CD-ROM, such as that produced through system 5 shown in FIG. 1.

FIG. 2 depicts a high-level block diagram of a typical client computer 200 that illustratively utilizes the present invention during the course of installing a program from a CD-ROM, such as that produced through system 5 shown in FIG. 1.

Here, to install a program from the CD-ROM, the user inserts, as symbolized by line 207, the CD-ROM into a CD-ROM drive associated with client computer 200. Either the user will manually instruct computer 200 to initiate execution of installation program 220 (typically named, e.g., "setup.exe" or "install.exe") stored on the CD-ROM or this program will automatically execute such as through a conventional "auto-run" capability both associated with program 220 and implemented on an operating system then executing on the client computer. Installation program 220 will execute as one of application programs 210 then executing on this client. Program 220, implementing a pre-defined installation process for the product and prior to transferring any program files for the product from the CD-ROM to local mass store, will execute Authentication Process 500. This process, described in detail below in conjunction with FIG. 5, will prompt the user to enter the indicia associated with the particular CD-ROM from which the program is then being installed. The user, in response to this prompt, will then manually enter, typically through a keyboard associated with computer 200, the specific 25-digit alphanumeric indicia, associated with this particular CD. Once the user signifies that (s)he has completely entered the indicia, typically by clicking with a mouse, an appropriate button then being displayed on a local monitor also associated with computer 200, Authentication Process 500 using information contained within the indicia, specifically the values of M, r and s, and specific data values, as defined below, stored on the CD-ROM itself will determine whether the indicia entered by the user is authentic, i.e., whether it emanates from the manufacturer and is authentic with respect to this particular CD-ROM.

If Authentication Process 500 successfully authenticates the indicia entered by the user, then this process so informs installation program 220 (as shown in FIG. 2), which, in turn, continues with the installation process and subsequently copies appropriate program files from the CD-ROM to client computer 200. However, if process 500 does not authenticate the indicia, then process 500 prematurely terminates the installation process without copying any program files onto client computer 200. Based on whether the indicia was authenticated or not, Authentication Process 500 generates and displays a suitable message, as symbolized by line 230, to the user. Should the indicia be authenticated or not, this message may simply be implicit in a generation and display of a next successive screen in a post-authentication phase of the installation process, or a specific warning message indicating that the user is not authorized to use the copy being installed and hence installation is terminated, respectively.

Figure 3:
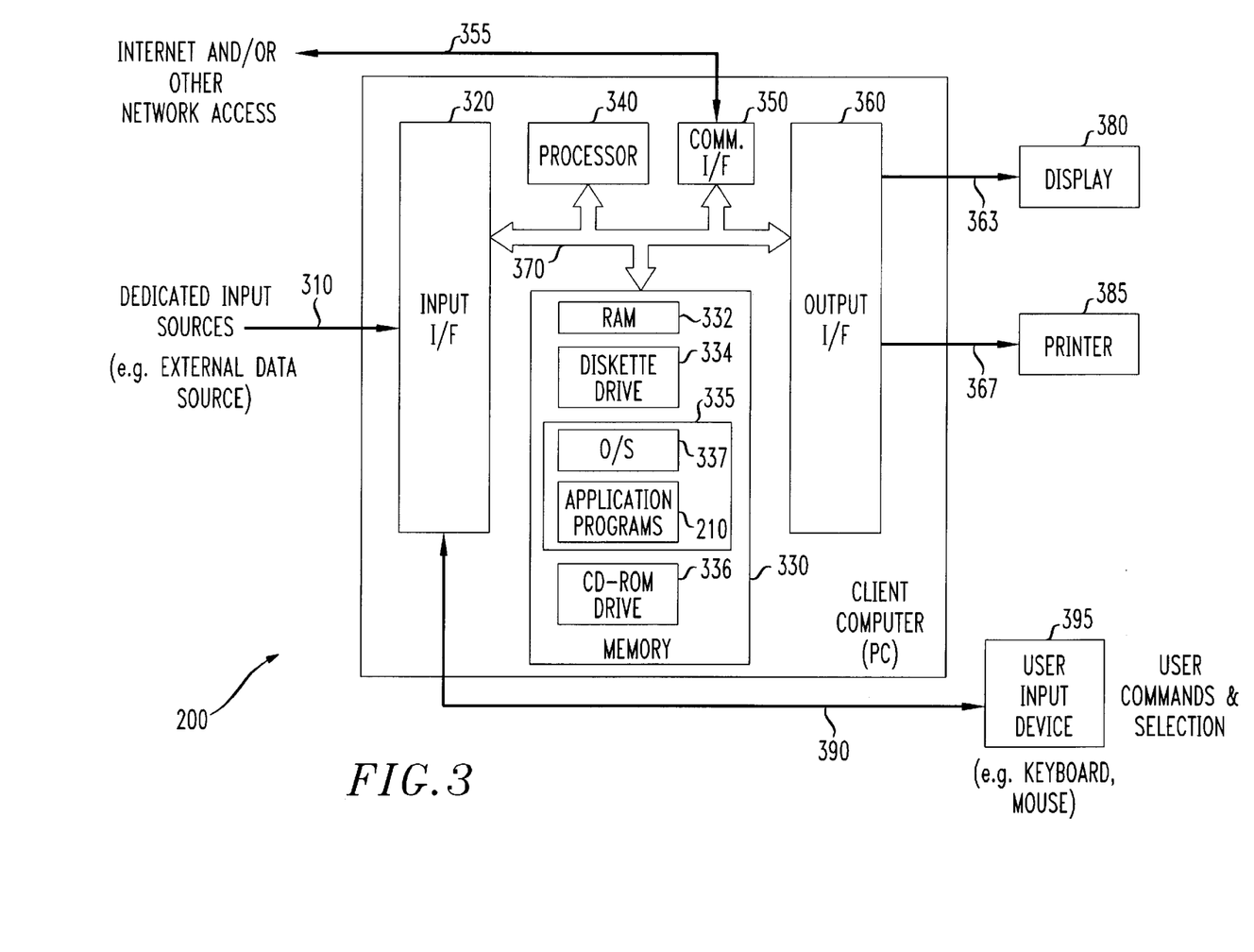
FIG. 3 depicts a block diagram of client computer 200 shown in FIG. 2.

FIG. 3 depicts a block diagram of client computer (PC) 200.

As shown, client computer 200 comprises input interfaces (I/F) 320, processor 340, communications interface 350, memory 330 and output interfaces 360, all conventionally interconnected by bus 370. Memory 330, which generally includes different modalities, such as illustratively: random access memory (RAM) 332 for temporary data and instruction store; diskette drive(s) 334 for exchanging information, as per user command, with floppy diskettes; non-volatile mass store 335 that is implemented through a hard disk, typically magnetic in nature; and CD-ROM driver 336. Though our inventive is discussed in the context of use with CD-ROM distributed software products, our invention is applicable with software products distributed on other mass media, such as, e.g., floppy diskettes, in which case the media would be inserted into an appropriate drive, such as diskette drive 334, from which the installation program would be read and executed. Mass store 335 may also contain another optical media reader (not specifically shown) (or writer) to read information from (and write information onto) suitable optical storage media. In addition, mass store 335 also stores executable instructions and associated data for operating system (O/S) 337 and application programs 210. Programs 210 include installation program 220 which, once loaded during a software installation process, itself contains inventive Authentication Process 500 (see FIG. 5). O/S 337, shown in FIG. 3, may be implemented by any conventional operating system, such as the WINDOWS NT operating system ("WINDOWS NT" is a registered trademark of Microsoft Corporation of Redmond, Wash. Given that, we will not discuss any components of O/S 337 as they are all irrelevant. Suffice it to say, that installation program 220, being one of application programs 210, executes under control of the O/S.

Advantageously, our present inventive technique, when embedded for use within a software product requires no other appreciable user interaction other than to enter the indicia for the specific product copy then being installed.

As shown in FIG. 3, incoming information can arise from two illustrative external sources: network supplied information, e.g., from the Internet and/or other networked facility, through network connection 355 to communications interface 350, or from a dedicated input source, via path(es) 310, to input interfaces 320. Dedicated input can originate from a wide variety of data sources, none of which is particularly relevant here. Though we are discussing our invention in the context of its use with local installation from a CD-ROM, our invention could be used with network installation of a product, such as over the Internet or other networked facility (e.g., an intranet), to computer 200. In this case, a manufacturer or site license administrator, such as upon receipt of electronic payment for the product copy or a duly authorized request for a licensed copy, could then download, from a remote network file server, a file containing a corresponding indicia for that product copy. If an associated installation program is to be remotely executed on the file server, then the server would access the file, stored on the client, containing the indicia and then proceed to authenticate that indicia prior to downloading any program files to computer 200. Alternatively, if the installation program is to locally execute, then once all the program and installation files have been downloaded by the server, the server (or the user at some later point in time) would initiate local execution of the installation program. This program would locally access the file containing the indicia and proceed to authenticate the product copy.

Input interfaces 320 contain appropriate circuitry to provide necessary and corresponding electrical connections required to physically connect and interface each differing dedicated source of input information to computer system 200. Under control of the operating system, application programs 210 exchange commands and data with the external sources, via network connection 355 or path(es) 310, to transmit and receive information typically requested by a user during program execution.

In addition, input interfaces 320 also electrically connect and interface user input device 395, such as a keyboard and mouse, to computer system 200. Display 380, such as a conventional color monitor, and printer 385, such as a conventional laser printer, are connected, via leads 363 and 367, respectively, to output interfaces 360. The output interfaces provide requisite circuitry to electrically connect and interface the display and printer to the computer system. Generally speaking and as one can appreciate, our present inventive technique can operate to generate unique, secure and authenticatable signatures for nearly any type of messages, not just to generate product copy indicia and regardless of the modalities through which client computer 200 will obtain, store and/or communicate these messages.

Furthermore, since the specific hardware components of computer system 200 as well as all aspects of the software stored within memory 335, apart from the modules that implement the present invention, are conventional and well-known, they will not be discussed in any further detail. Generally speaking, computer 10 has an architecture that is similar to that of client computer 200.

B. Inventive Technique

Through our present invention, given a message, such as, e.g., a numerical product copy identifier, an authentic signature is generated for that message, based on a public-key cryptographic system, and through use of a generator value selected from points on an elliptic curve over a finite field. Our technique relies generating the authentic signature using the generator value in conjunction with three keys for an illustrative signing party A: a public key (PA), a private key (SA) and a secret key (KA).

As in public-key cryptography, a signature for a message (M) is generated, by its signor A, as a function of the message and the public and private keys of the signor, i.e.:

Sign (M,PA,SA)→SIGNATURE_A(M).

A recipient of this message, B, can verify the signature of the message (s)he receives as a function of the message, its signature and the public key of its signor, i.e., Verify (M,SIGNATURE_A(M),PA). The results of the verification are generally a yes/no indication specifying whether the signature is either valid or not. If the signature is valid, it is seen as being one that results from use of the particular public and private keys ("key pair") of the signor. Should a third party gain knowledge of this key pair, either through cryptanalysis of messages and associated signatures or illicitly, such as through theft of these keys, that party can generate new signed message pairs, i.e., messages and valid signatures for each of those messages.

Our inventive technique substantially increases the security associated with signatures by requiring an authentic signature to be produced from not just the public and private keys of the signor but also from the secret key of the signor:

Authentic_Sign (M,PA, SA,KA)→AUTHENTIC_SIGNATURE_A(M).

Through use of our invention, knowledge of the public and private keys alone is grossly insufficient to permit one, in the realm of current feasibility and without knowledge of the secret key, to generate a new signed message pair containing an authentic signature. We believe that, given many messages and their authentic signatures, a task of recovering the secret key from signed message pairs, i.e., from just messages and authentic signatures, is also simply infeasible. In that regard, we estimate that, for an 83-bit binary authentic signature, a probability of generating such an authentic signature, without prior knowledge of the secret key, is on the order of $(0.5)^{30}$—which, given its infinitesimal magnitude, approximates a probability associated with a random guess.

In essence and in accordance with our inventive teachings, given points on a specific elliptic curve, the value of a certain point on the curve is selected as a generator value. The private key is randomly selected. The public key is determined as a predefined function of the values of the generator and the private key, particularly exponentiation of the former by the latter. The secret key is used to generate a pseudo-random number. A first portion of the authentic signature is then generated through predefined functions of the generator, the pseudo-random number and a message (e.g., a randomly selected product copy identifier). Specifically, the generator is first exponentiated by the value of the pseudo-random number to yield a value which, in turn, is then concatenated with the message. A resulting concatenated number is then processed through a predetermined hash function to yield the first portion of the authentic signature. A remaining portion of the authentic signature is produced in response to a predefined function of the first portion, the pseudo-random value and the private key. The entire authentic signature is finally produced by concatenating both portions of the signature together.

When our invention is used to implement product copy indicia, the public key and the generator value are stored within an appropriate file(s) in the product copy itself for use in authenticating that copy during its installation on a client computer, e.g., client computer 200 shown in FIG. 2.

During installation of that product copy, the signature entered by a user is authenticated by first computing, at the client computer, the first portion of the signature using the generator value, the public key and the entire indicia, specifically its identifier and the signature, entered by the user; and then determining whether the value of this first portion identically matches the value of same portion in the signature which the user entered. If such a match exists, the entered signature is authentic and installation of the product copy continues; otherwise, it is not authentic and installation of that copy prematurely terminates.

Three distinct phases are used to implement our invention in conjunction with generating product copy indicia: (a) initialization, that occurs once, typically by the software manufacturer, to generate various parameter values; (b) indicia generation (specifically process 400 which is discussed below in detail in conjunction with FIG. 4), which repeatedly occurs at a media duplication site, using the parameter values produced during initialization, to generate, for each different product copy, a corresponding indicia containing an authentic signature for use with that copy; and (c) authentication (specifically process 500 which is discussed in detail below in conjunction with FIG. 5), that separately and subsequently occurs, during execution of an installation program at a user site (client computer), to authenticate the signature, in an indicia entered by a user and associated with a particular product copy which the user is then attempting to install and so continue installation of that copy or not.

Inasmuch as an authentic signature generated through our present invention can be verified in a conventional manner through use of the public key, then, for the sake of brevity, we will omit all details of how verification is specifically accomplished.

1. Definitional and Initialization Aspects

We will first define various variables used by our inventive technique and the steps that are used to initialize our technique.

First, a finite field (K) is defined, preferably over a Galois field, i.e., K=GF(p) such that p is very large, e.g., 384 bits or larger, and p=1(mod 4). As an alternate, this field could be defined as K=GF($2^m$).

Next, an elliptic curve E is then defined over this field. In accordance with our inventive teachings, we utilize an elliptic curve over which complex addition and complex multiplication exist in order to permit the parameters, and the resulting indicia, used in our inventive technique to be relatively short and still provide requisite security against certain forms of cryptographic attack—which security, in the absence of using elliptic curves, would not be possible for such short parameters. Generally speaking, elliptic curves contain points (x, y) that satisfy curves of the form: $y^2=ax^3+bx^2+cx+d$, where a, b, c and d are predefined coefficients. By varying the values of these four coefficients, the number of points on the curve will vary accordingly. Though we could use an elliptic curve of the general form, we preferably and illustratively choose curve $y^2=x^3+x$ over finite field K which, in turn, permits the number of points, |E|, on the curve E to be calculated as follows. If $p=\alpha^2+\beta^2$ where $\alpha=1$ (mod 4), then $|E|=p+1-2\alpha=(\alpha-1)^2+\beta^2$. Hence, the number of points on the curve can be set by choosing $\alpha$ and $\beta$ accordingly.

A large prime number, q, is selected such as at least approximately 60 bits in length, and $\alpha$ and $\beta$ are set accordingly in order to ensure that q divides evenly into |E| and also satisfies 1(mod 4).

Once a value of q is chosen accordingly, a value of generator g, typically a random point, is defined on curve E for a subgroup of order q. This is typically accomplished by repeatedly selecting a random point as g, on curve E, and testing its properties, i.e., whether that number satisfies the following equations G={g, 2g, 3g, . . . , (q-1)g} and |G|=q, until a suitable number is found.

Once an appropriate value of a generator has been chosen, then a random number is picked as a private exponent, X. This number, X, becomes the private key. The parameter $g_{pow}$ is the public key and is computed as equaling $g^x$.

Lastly, the secret key, KA, is defined as illustratively a concatenation of two pre-defined components, $A_1$ and $A_2$, i.e., KA=($A_1 \circ A_2$).

Once the above parameters have been defined, parameters q, g, $g_{pow}$ and X are then stored for subsequent use during each execution of Indicia Generation Process 400 to generate each indicia, including a unique identifier and an associated authentic signature, for each and every different copy of every software product which the manufacturer then produces. Furthermore, the values of parameters g and $g_{pow}$ and a specification of a HASH function, as discussed below, are all stored as data within each such product copy, for subsequent access and use during the installation of that copy, specifically during authenticating (i.e., during execution of Authentication Process 500 discussed in detail below) an indicia manually entered by a user during installation of that copy.

2. Indicia Generation Process 400

Figure 4:
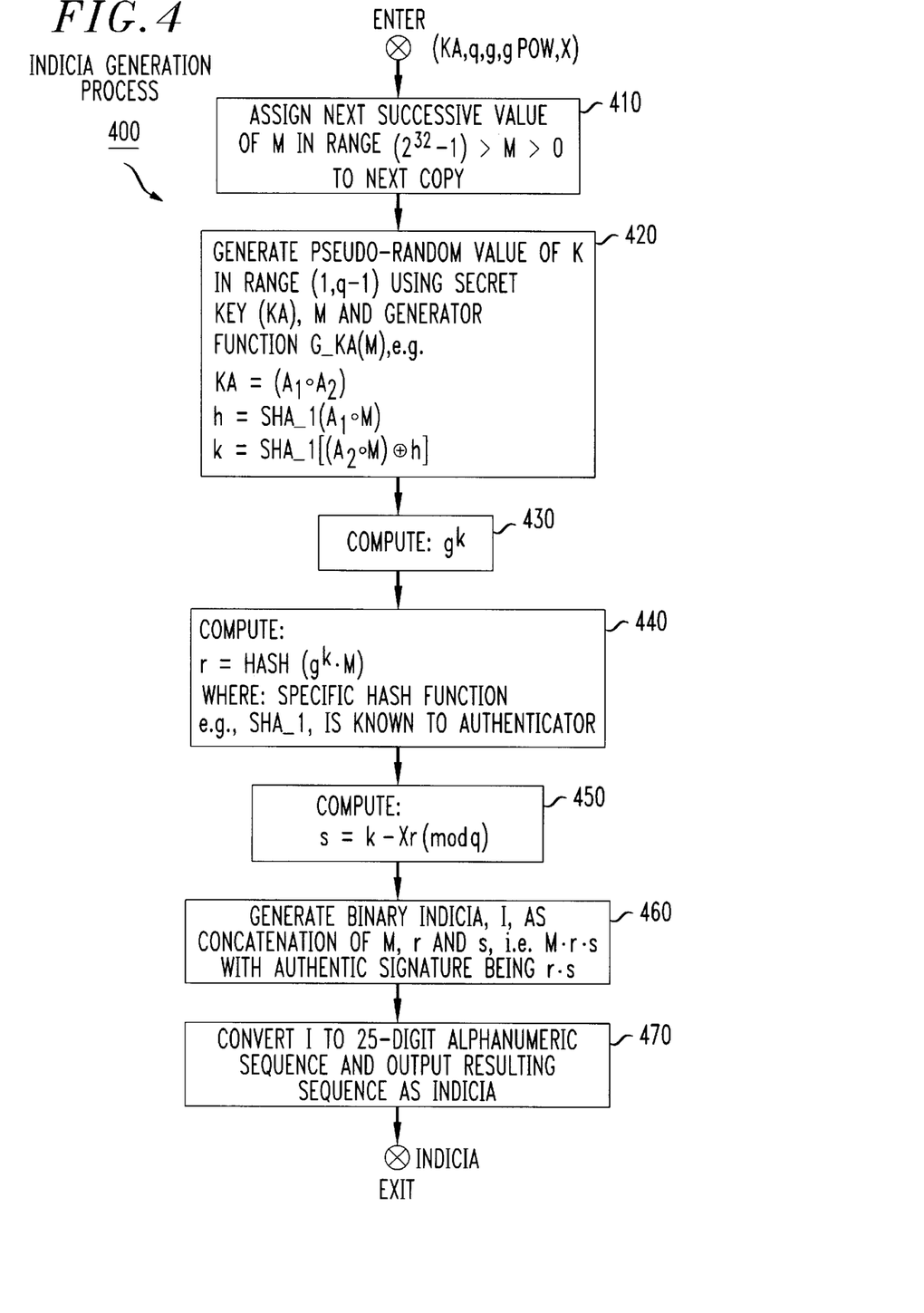
FIG. 4 depicts a flowchart of Indicia Generation Process 400 that is executed within computer 10 shown in FIG. 1.

FIG. 4 depicts a flowchart of Indicia Generation Process 400. As discussed above, this process is separately executed by computer 10, and is implemented by appropriate stored program (executable) instructions residing in its memory (not specifically shown), to generate a unique indicia for each successive product copy. This process uses the values of secret key KA, q, g, $g_{pow}$ and private exponent X.

Upon entry into process 400, execution first proceeds to block 410. This block, when executed, randomly assigns a next successive (though unused) value, as an identifier (here M) in the range of ($2^{32}-1$)>M>0 to a current product copy. Alternatively, this identifier can be sequentially assigned. In that case, the identifier is assigned a value of one for a first product copy, a value of two for a second product copy and so forth, across all product copies and all different products emanating from a software manufacturer. In any event, each copy of any product has a unique identifier. If more than $2^{32}$ copies of all products of a software manufacturer are expected to be produced during an interval of time over which the present inventive technique is to be used to generate product indicia, then this technique can be modified, in a manner readily apparent to those skilled in the art, to use longer identifiers and hence longer keys and parameter values.

Once an appropriate value has been so assigned by block 410 as the identifier for the current product copy, execution proceeds to block 420. This block generates a pseudo-random value of an exponent, k in the range of [1, q-1], using the secret key and the identifier, M, assigned to the current product copy. Generally speaking, k=G_MS(M) where G_MS is a pseudo-random number generator. Preferably, the pseudo-random number generator is implemented using a conventional and well-known secure hash function, specifically SHA_1. Such a hash function maps any length digital input number to a 160-bit value such that locating any pair of equal-length numbers, (x, y), where SHA_1(x)=SHA_1(y), is infeasible, i.e., here would require in excess of $2^{80}$ operations. In particular and as noted above, the secret key, KA, is illustratively a concatenation of two pre-defined components, $A_1$ and $A_2$, i.e., KA=($A_1 \circ A_2$), and once generated, remains fixed while generating all product copy indicia. To calculate k, block 420 first parses the secret key into its components $A_1$ and $A_2$ and then using multiple hash operations calculates exponent k as given by equations (1) and (2) as follows:

$$h = \text{SHA\_1}(A_1 \circ M) \tag{1}$$

$$k = \text{SHA\_1}[(A_2 \circ M)] \oplus h \tag{2}$$

For added security, the value of k produced through equations (1) and (2) can be processed, as a seed, through another pseudo-random function to yield a new pseudo-random value of k, wherein the new value could alternatively be used, in lieu of that generated by these equations, during the remaining steps for generating the indicia for the current product copy.

Once the value of k has been so determined, as set forth above, for the current product copy, block 430 executes to calculate $g^k$. Thereafter, execution proceeds to block 440 which, using a HASH function known to an authenticating party, determines a value of parameter r as a function of $g^k$ and M and in accordance with equation (3) as follows. This hash function is illustratively the SHA_1 function.

$$r = \mathrm{HASH}(g^k \circ M) \quad (3)$$

Next, block 450 executes to calculate parameter s as a function of k, X, r and q, and in accordance with equation (4) as follows:

$$s = k - X\, r (\bmod\ q) \quad (4)$$

Once s has been fully calculated, execution proceeds to block 460 which forms a 115-bit binary indicia as a concatenation of M, r and s, where the authentic signature itself is the concatenation of r and S. After the binary indicia is formed, block 470 converts this indicia to a 25-digit alphanumeric form and then applies the resulting alphanumeric indicia as an output value, such as to printer 60 (see FIG. 1), for use in conjunction with the current product copy. To reduce confusion and possible mistakes by the user in manually entering the indicia and thus provide enhanced usability, block 470 (shown in FIG. 4) preferably does not use, depending on a font with which the indicia will be printed, certain alphanumeric characters, such as, letters I and O (whether in upper or lower case), numeral zero, lower case L, and numeral 1 and so forth that might appear similar to a user. In addition, similarly appearing characters, such as a lower case "L" and the numeral "1", can be mapped to a common character, e.g., the numeral "1".

We estimate that, through our present invention and given a public/private-key pair, an authentic 83-bit signature could be generated, given a 32-bit identifier value, well within one second of processing time on a currently available PC.

3. Authentication Process 500

Figure 5:
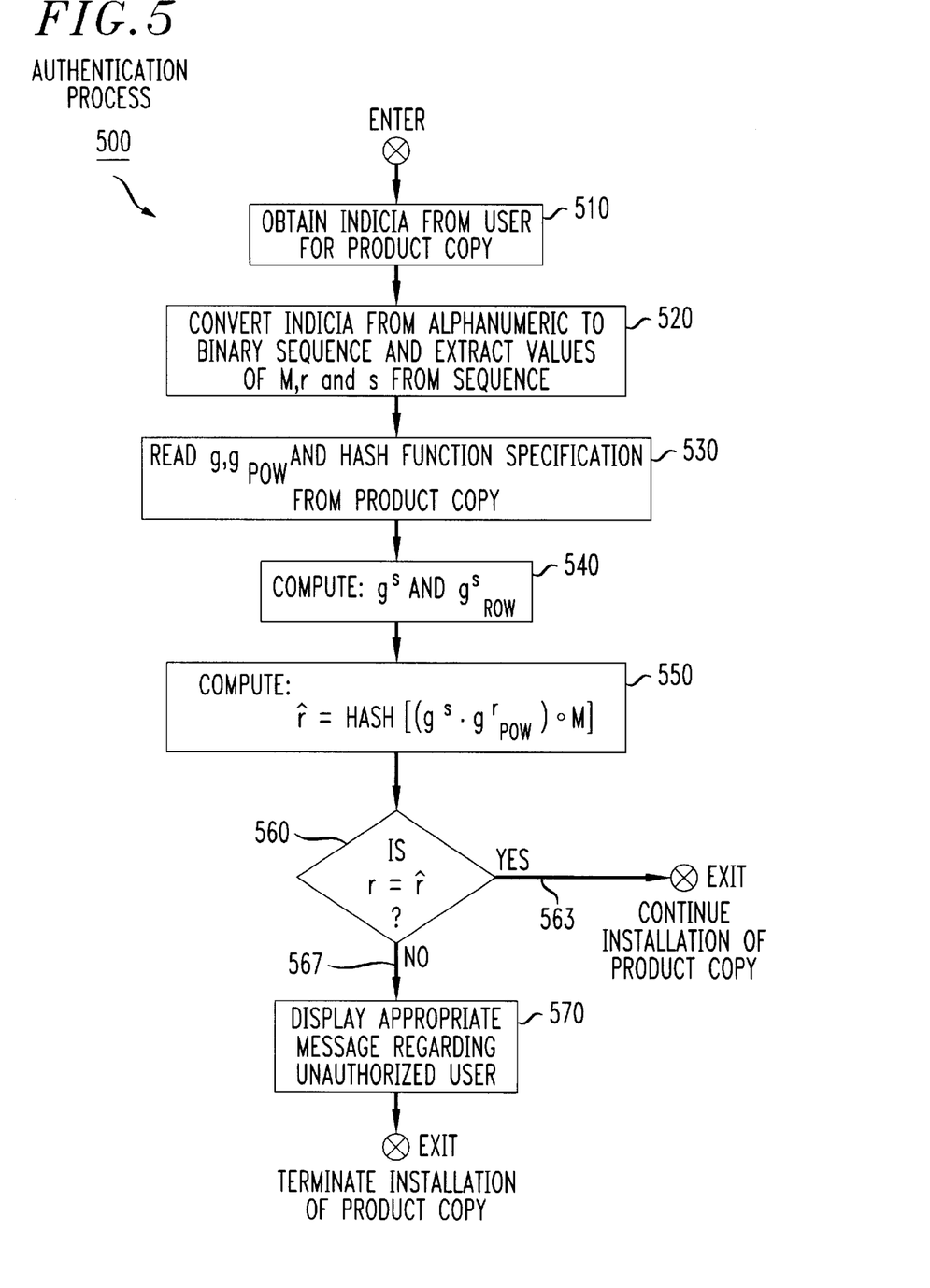
FIG. 5 depicts a flowchart of Authentication Process 500 that executes within client computer 200 shown in FIGS. 2 and 3.

FIG. 5 depicts a flowchart of Authentication Process 500 that executes within a client computer, such as computer 200 shown in FIGS. 2 and 3. As discussed above, this process authenticates an indicia manually entered by a user for a given product copy during installation of that copy onto the client computer. Stored within the given product copy, and common to all product copies from the software manufacturer, are the values of g, $g_{pow}$ and a specification of a HASH function to be used during authentication. Though, for simplification, we describe the values of parameters g and $g_{pow}$ and the specification of the HASH function as being common to all copies of all products for a given software manufacturer, for added security, these parameter values and the HASH function specification could be common just across all the copies of a particular product(s) from that manufacturer or a set of specific copies of that product (s), or could be unique to just one such copy.

Upon entry into process 500, execution first proceeds to block 510. This block reads the alphanumeric indicia which the user has manually entered for the particular product copy (s)he is now attempting to install on his(her) client computer, e.g., client computer 200 shown in FIGS. 2 and 3. Once this indicia has been read, block 520 executes to first convert the alphanumeric indicia into a binary sequence and then extract the values of parameters M, r and s in that indicia. Thereafter, execution proceeds to block 530 which reads from the product copy itself stored values of the parameters g and $g_{pow}$ and a specification of a specific hash function to be used for authentication.

Once these parameter values and the hash function specification have been read by block 530, execution proceeds to block 540 which, when executed, computes the values of $g^s$ and $g_{pow}{}^r$ using the values of r and s that have just been extracted from the indicia. Once the values are computed, blocks 550 and 560 execute to collectively authenticate the indicia by first computing a portion of the authentic signature, specifically, the parameter r (here, the recomputed portion being denoted as r̂) and then comparing its value to the value of the same parameter extracted from the indicia. In particular, block 550 computes r̂ in accordance with equation (5) as follows:

$$\hat{r} = \mathrm{HASH}[(g^s \cdot g_{pow}{}^r) \circ M] \quad (5)$$

where: HASH is a hash function as specified in the product copy for use during authentication. This function is typically the SHA_1 function.

After a value r̂ has been calculated, execution proceeds to decision block 560 which tests this value against the value of r extracted from the indicia entered by the user. If these two values are identical (match), then the signature in the indicia has been authenticated. Hence, execution exits, via YES path 563, from Authentication Process 500 to continue installation of this product copy. Alternatively, if these two values differ at all, then the indicia, particularly the signature it contains, is not authentic. Hence, the user is not authorized to install the product copy. In this instance, decision block 560 routes execution, via NO path 567, to block 570. This latter block, when executed, displays an appropriate message on a local monitor (e.g., display 380 shown in FIG. 3) stating that the user is not authorized to install the product copy. Once this message is so displayed, execution exits (as shown in FIG. 5) from process 500 but in such a manner as to prematurely terminate further installation of the product copy.

By now, those skilled in the art will realize that although we have described our inventive technique for generating secure and authentic signatures as part of indicia for use with software product copies that are to be installed on user computers, our invention can be used to serialize, in a highly secure manner previously installed software copies whenever a user establishes a network connection with a server operated by the software manufacturer. In particular, should a user of an O/S executing at a client computer establish an Internet connection to a web site of the manufacturer of that O/S, a web server could generate an installation number, such as an indicia as described above containing an authentic signature, and download that number for storage onto the client computer (assuming, of course, that a web browser executing at the client computer is set to accept "cookies", i.e. to accept such a download). This installation number can then be used by the manufacturer to uniquely and securely identify that particular O/S installation. Whenever that user subsequently establishes an Internet connection with the web site of the manufacturer, the manufacturer could readily identify the specific installation of the O/S by accessing and authenticating the installation number stored on the client computer. Through successful authentication of stored installation numbers, the manufacturer could distinguish between authorized and non-authorized O/S installations. Hence, the manufacturer could offer product support, upgrades, promotions and/or other services to just the former installations, while denying them to the latter installations. Similarly, the manufacturer could generate and download a unique installation number for other types of software program copies, such as application programs, which are previously installed and for which the manufacturer would like to subsequently identify.

Moreover, though the indicia have utilized a product copy identifier as the message for which an authentic signature is generated, this message is not so limited. This message can constitute any form of digital information that is to be electronically encrypted and communicated from one party to another. Hence, the invention can provide a highly secure mechanism to authenticate each message in a stream of encrypted message traffic transiting between a sending and a receiving party.

In addition, though we have described our inventive technique as using a secure hash function for generating parameters r and r̂ in the indicia generation and authentication processes (specifically blocks 440 and 550 in FIGS. 4 and 5, respectively), other secure functions could be used provided the same function is employed in both processes and a specification of that function is stored in the associated product copy and read by the authentication process during installation of that particular copy.

Furthermore, while we have illustratively described our invention for use with 32-bit messages (here, illustratively product copy identifiers) and 83-bit authentic signatures, our invention can be readily modified, given its intended application, to accommodate longer messages and signatures, or, in those applications where less security can be tolerated, shorter messages and signatures.

Although an embodiment, with various modifications, which incorporates the teachings of the present invention has been shown and described in detail herein, those skilled in the art can readily devise many other embodiments that still utilize these teachings.

We claim:

1. A method for generating an indicia, containing an authentic signature, for association with a corresponding product copy, wherein the authentic signature is used in conjunction with a public-key cryptosystem having a public key (PA) and a private key (SA), the method comprising the steps of:

assigning a unique identifier, as message M, to the product copy;

generating the authentic signature in response to the private key, the message, a predefined generator value (g) selected from a plurality of points on an elliptic curve over a finite field, and a third key (KA) different from the public and private keys and which is neither a public nor a private key within any key pair in an asymmetric key system;

forming the indicia in response to the identifier and the authentic signature and associating the indicia with the product copy.

2. The method in claim 1 wherein the indicia forming step comprises the step of concatenating the identifier with the authentic signature to yield the indicia.

3. The method in claim 2 wherein assigning step comprises the step of selecting the unique identifier either as a random value within a given range or as a next available number in a predefined sequence in the range.

4. The method in claim 3 wherein the generating step comprises the steps of:

generating a first portion (r) of the authentic signature in response to the generator value, the secret key and the message; and generating a second portion (s) of the authentic signature in response to the first portion of the authentic signature, and the secret and private keys.

5. The method in claim 4 wherein the generating step further comprises the steps of:

generating a first parameter value (k) as a predefined pseudo-random function of the secret key (KA); and determining the first portion (r) of the authentic signature as a first pre-determined function of the first parameter value, the generator value and the message.

6. The method in claim 5 wherein the predefined pseudo-random function comprises a first predefined hash function.

7. The method in claim 6 wherein the third key is a secret key and is formed of a concatenation of a first key portion ($A_1$) and a second key portion ($A_2$), and the first parameter value (k) is determined through the following equations:

$$h = \text{SHA\_1} \ (A_1 \circ M);$$

and $$k = \text{SHA\_1} \ [(A_2 \circ M)] \oplus h$$

where: SHA_1 is a SHA_1 hash function.

8. The method in claim 7 further comprising the step of applying the first parameter value as an input to a predetermined pseudo-random function to yield a new value for the first parameter value.

9. The method in claim 8 wherein the finite field is defined over a Galois field.

10. The method in claim 8 wherein the elliptic curve is of the form $y^2 = x^3 + x$.

11. The method in claim 8 further comprising the steps of:

converting the indicia to an alphanumeric form so as to yield an alphanumeric indicia; and affixing the alphanumeric indicia to the product copy or a component thereof.

12. The method in claim 5 further comprising the steps of:

producing the second portion (s) of the authentic signature in response to a second predefined function of the first parameter value, the private key and the first portion of the authentic signature; and concatenating the first and second portions of the authentic signature to yield the authentic signature.

13. The method in claim 12 wherein the first portion of the authentic signature is calculated according to the following equation:

$$r = f(g^k \circ M)$$

where: f is a predefined secure function.

14. The method in claim 13 wherein the function f is a predefined HASH function.

15. The method in claim 14 wherein the predefined HASH function is a SHA_1 hash function.

16. The method in claim 13 wherein the second portion (s) of the authentic signature is calculated according to the following equation:

$$s = k - Xr \ (\text{mod } q)$$

where: X is the private key (SA); and q is a predefined prime number.

17. The method in claim 14 wherein the finite field is defined over a Galois field.

18. The method in claim 14 wherein the elliptic curve is of the form $y^2 = x^3 + x$.

19. The method in claim 14 further comprising the steps of:

converting the indicia to an alphanumeric form so as to yield an alphanumeric indicia; and affixing the alphanumeric indicia to the product copy or a component thereof.

20. A computer readable medium having computer executable instructions stored therein for performing the steps of claim 1.

21. A method for authenticating an indicia associated with a corresponding product copy being installed on a computer, the indicia having a product copy identifier and an associated signature generated through a public-key cryptosystem, the public-key cryptosystem having a public key (PA), a private key (SA) and a third key (KA) wherein the third key is different from the first and second keys, the method comprising the steps, during installation of the product copy on a computer, of:

obtaining the indicia for a product copy during installation of the product copy on a computer; and authenticating the signature contained in the indicia, comprising the steps of:

extracting from the indicia, first and second portions of the signature, so as to yield extracted first and second portions of the signature, and the identifier;

determining a new value of the first portion of the signature in response to a predefined generator value (g) selected from a plurality of points on an elliptic curve over a finite field, the identifier and the extracted first and second portions of the signature; and ascertaining whether the new value of the first portion matches the first extracted portion or not so as to signify whether the signature contained in the indicia is authentic or not; and if the signature is authentic or not, continuing the installation of the product on the computer or terminating the installation, respectively.

22. The method in claim 21 wherein the determining step comprises the step of obtaining stored values of the generator value and the public key from the product copy.

23. The method in claim 22 wherein the new value determining step comprises the step of generating the new value as a predefined function of the generator value, the public key, the message and the extracted first and second portions (r and s, respectively) of the signature.

24. The method in claim 21 wherein the new value ($\hat{r}$) is calculated according to the following equation:

$$\hat{r}=\text{HASH}\,[(g^s \cdot g_{pow}{'}) \circ M]$$

where: $g_{pow}$ is the public key; and

HASH is a predefined hash function used in generating the signature.

25. The method in claim 24 wherein the hash function is a SHA_1 hash function.

26. The method in claim 24 wherein the finite field is defined over a Galois field.

27. The method in claim 24 wherein the elliptic curve is of the form $y^2=x^3+x$.

28. A computer readable medium having computer executable instructions stored therein for performing the steps of claim 21.

29. Apparatus for generating an indicia, containing an authentic signature, for association with a corresponding product copy, wherein the authentic signature is used in conjunction with a public-key cryptosystem having a public key (PA) and a private key (SA), the apparatus comprising:

a processor; and a memory having computer executable instructions stored therein;

wherein the processor, in response to the stored instructions:

assigns a unique identifier, as message M, to the product copy;

generates the authentic signature in response to the private key, the message, a predefined generator value (g) selected from a plurality of points on an elliptic curve over a finite field, and a third key (KA) different from the public and private keys and which is neither a public nor a private key within any key pair in an asymmetric key system;

forms the indicia in response to the identifier and the authentic signature and associates the indicia with the product copy.

30. The apparatus in claim 29 wherein the processor, in response to the stored instructions, concatenates the identifier with the authentic signature to yield the indicia.

31. The apparatus in claim 30 wherein the processor, in response to the stored instructions, selects the unique identifier either as a random value within a given range or as a next available number in a predefined sequence in the range.

32. The apparatus in claim 31 wherein the processor in response to the stored instructions:

generates a first portion (r) of the authentic signature in response to the generator value, the secret key and the message; and generates a second portion (s) of the authentic signature in response to the first portion of the authentic signature, and the secret and private keys.

33. The apparatus in claim 32 wherein the processor, in response to the stored instructions:

generates a first parameter value (k) as a predefined pseudo-random function of the secret key (KA); and determines the first portion (r) of the authentic signature as a first pre-determined function of the first parameter value, the generator value and the message.

34. The apparatus in claim 33 wherein the predefined pseudo-random function comprises a first predefined hash function.

35. The apparatus in claim 34 wherein the third key is a secret key and is formed of a concatenation of a first key portion ($A_1$) and a second key portion ($A_2$), and the first parameter value (k) is determined through the following equations:

$$h=\text{SHA\_1}\,(A_1 \circ M);$$

and $$k=\text{SHA\_1}\,[(A_2 \circ M)] \oplus h$$

where: SHA_1 is a SHA_1 hash function.

36. The apparatus in claim 35 wherein the processor, in response to the stored instructions, applies the first parameter value as an input to a predetermined pseudo-random function to yield a new value for the first parameter value.

37. The apparatus in claim 36 wherein the finite field is defined over a Galois field.

38. The apparatus in claim 36 wherein the elliptic curve is of the form $y^2=x^3+x$.

39. The apparatus in claim 36 wherein the processor, in response to the stored instructions:
converts the indicia to an alphanumeric form so as to yield an alphanumeric indicia; and
affixes the alphanumeric indicia to the product copy or a component thereof.

40. The apparatus in claim 33 wherein the processor, in response to the stored instructions:
produces the second portion (s) of the authentic signature in response to a second predefined function of the first parameter value, the private key and the first portion of the authentic signature; and
concatenates the first and second portions of the authentic signature to yield the authentic signature.

41. The apparatus in claim 40 wherein the first portion of the authentic signature is calculated according to the following equation:

$$r = f(g^k \circ M)$$

where: f is a predefined secure function.

42. The apparatus in claim 41 wherein the function f is a predefined HASH function.

43. The apparatus in claim 42 wherein the predefined HASH function is a SHA_1 hash function.

44. The apparatus in claim 41 wherein the second portion (s) of the authentic signature is calculated according to the following equation:

$$s = k - X\,r \pmod{q}$$

where: X is the private key (SA); and
q is a predefined prime number.

45. The apparatus in claim 44 wherein the finite field is defined over a Galois field.

46. The apparatus in claim 44 wherein the elliptic curve is of the form $y^2 = x^3 + x$.

47. The apparatus in claim 44 wherein the processor, in response to the stored instructions:
converts the indicia to an alphanumeric form so as to yield an alphanumeric indicia; and
affixes the alphanumeric indicia to the product copy or a component thereof.

48. Apparatus for authenticating an indicia associated with a corresponding product copy being installed on a computer, the indicia having a product copy identifier and an associated signature generated through a public-key cryptosystem, the public-key cryptosystem having a public key (PA), a private key (SA) and a third key (KA) wherein the third key is different from the first and second keys, the apparatus comprising:
a processor; and
a memory having computer executable instructions stored therein;
wherein the processor, in response to the stored instructions and during installation of the product copy on a computer:
obtains the indicia for a product copy during installation of the product copy on a computer;
extracts from the indicia, first and second portions of the signature, so as to yield extracted first and second portions of the signature, and the identifier;
determines a new value of the first portion of the signature in response to a predefined generator value (g) selected from a plurality of points on an elliptic curve over a finite field, the identifier and the extracted first and second portions of the signature;
ascertains whether the new value of the first portion matches the first extracted portion or not so as to signify whether the signature contained in the indicia is authentic or not; and
if the signature is authentic or not, continues the installation of the product on the computer or terminates the installation, respectively.

49. The apparatus in claim 48 wherein the processor, in response to the stored instructions, obtains stored values of the generator value and the public key from the product copy.

50. The apparatus in claim 49 wherein the processor, in response to the stored instructions, generates the new value as a predefined function of the generator value, the public key, the message and the extracted first and second portions (r and s, respectively) of the signature.

51. The apparatus in claim 50 wherein the new value ($\hat{r}$) is calculated according to the following equation:

$$\hat{r} = \text{HASH}\,[(g^s \cdot g_{pow}{}^r) \circ M]$$

where: $g_{pow}$ is the public key; and
HASH is a predefined hash function used in generating the signature.

52. The apparatus in claim 51 wherein the hash function is a SHA_1 hash function.

53. The apparatus in claim 51 wherein the finite field is defined over a Galois field.

54. The apparatus in claim 51 wherein the elliptic curve is of the form $y^2 = x^3 + x$.

* * * * *